(12) United States Patent
Mayer et al.

(10) Patent No.: US 12,411,038 B2
(45) Date of Patent: Sep. 9, 2025

(54) FILL-LEVEL MEASURING DEVICE

(71) Applicant: Endress+Hauser SE+Co. KG, Maulburg (DE)

(72) Inventors: Winfried Mayer, Buch (DE); Pablo Ottersbach, Essen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 305 days.

(21) Appl. No.: 18/252,536

(22) PCT Filed: Sep. 23, 2021

(86) PCT No.: PCT/EP2021/076265
§ 371 (c)(1),
(2) Date: May 11, 2023

(87) PCT Pub. No.: WO2022/100916
PCT Pub. Date: May 19, 2022

(65) Prior Publication Data
US 2024/0003732 A1    Jan. 4, 2024

(30) Foreign Application Priority Data
Nov. 11, 2020 (DE) ............ 10 2020 129 765.3

(51) Int. Cl.
*G01F 23/284* (2006.01)

(52) U.S. Cl.
CPC .................. *G01F 23/284* (2013.01)

(58) Field of Classification Search
CPC ... G01F 23/284; H01Q 21/0037; G01S 7/032; G01S 13/88
See application file for complete search history.

(56) References Cited

U.S. PATENT DOCUMENTS

| | | | | |
|---|---|---|---|---|
| 4,168,504 A | * | 9/1979 | Davis | H01Q 13/025 343/786 |
| 4,641,083 A | * | 2/1987 | Ohno | G01F 23/2845 324/160 |

(Continued)

FOREIGN PATENT DOCUMENTS

| | | |
|---|---|---|
| CN | 109149123 A1 | 1/2019 |
| CN | 111721357 A | 9/2020 |

(Continued)

*Primary Examiner* — Peter M Bythrow
(74) *Attorney, Agent, or Firm* — Kelly J. Smith; Endress+Hauser (USA) Holding, Inc.

(57) ABSTRACT

The relates to a measuring device neck of a radar based, fill level measuring device for determining a fill level profile ($L(\alpha,\beta)$) of a fill substance. In the measuring device neck, the waveguides for contacting the antenna arrangement are aligned along a contour ($k_1$, $k_2$), which surrounds the device neck axis radially symmetrically and adjoins the measuring device neck. Such is advantageous, since the waveguides can be made together as a monolithic, basic body, which can be inserted easily into the measuring device neck. Furthermore, the arrangement of the waveguides in the measuring device neck favors the thermal management in the transmitting/receiving electronics of the fill level measuring device, since its thermally critical radar chips can be spaced maximally from one another.

12 Claims, 5 Drawing Sheets

(56) References Cited

U.S. PATENT DOCUMENTS

| | | | | |
|---|---|---|---|---|
| 5,872,494 A * | 2/1999 | Palan | | G01F 23/284 |
| | | | | 333/252 |
| 6,266,022 B1 * | 7/2001 | Muller | | G01F 23/284 |
| | | | | 343/703 |
| 8,089,415 B1 * | 1/2012 | West | | H01Q 5/55 |
| | | | | 343/777 |
| 2002/0023489 A1 * | 2/2002 | Reimelt | | G01F 23/284 |
| | | | | 73/290 V |
| 2003/0151560 A1 * | 8/2003 | Kienzle | | A61P 37/02 |
| | | | | 343/786 |
| 2004/0145510 A1 * | 7/2004 | Edvardsson | | H01Q 15/006 |
| | | | | 342/124 |
| 2007/0115196 A1 * | 5/2007 | Motzer | | G01F 23/284 |
| | | | | 343/786 |
| 2009/0033544 A1 * | 2/2009 | Duivenvoorden | | H01P 5/024 |
| | | | | 342/124 |
| 2016/0041023 A1 * | 2/2016 | Ito | | H01P 5/087 |
| | | | | 342/124 |
| 2019/0094060 A1 * | 3/2019 | Blödt | | G01S 13/30 |
| 2019/0101429 A1 * | 4/2019 | Kleman | | G01F 23/284 |
| 2019/0107427 A1 * | 4/2019 | Waelde | | G01S 13/88 |
| 2020/0235452 A1 * | 7/2020 | Kienzle | | G01F 23/284 |
| 2020/0333176 A1 * | 10/2020 | Welle | | G01S 7/352 |
| 2020/0386601 A1 * | 12/2020 | Waelde | | G01S 7/032 |
| 2022/0049984 A1 * | 2/2022 | Winfried | | H01Q 13/02 |
| 2023/0243686 A1 * | 8/2023 | Welle | | G01S 7/023 |
| | | | | 342/124 |

FOREIGN PATENT DOCUMENTS

| | | |
|---|---|---|
| DE | 102012104090 A1 | 11/2013 |
| DE | 102017210781 A1 | 4/2018 |
| DE | 102020129427 A1 | 5/2022 |
| DE | 102021118496 A1 | 1/2023 |
| DE | 102021121547 A1 | 2/2023 |
| WO | 2004057366 A1 | 7/2004 |
| WO | 2016202394 A1 | 12/2016 |

* cited by examiner

FILL-LEVEL MEASURING DEVICE

CROSS-REFERENCE TO RELATED APPLICATIONS

The present application is related to and claims the priority benefit of DPMA Patent Application No. 10 2020 129 765.3, filed on Nov. 11, 2020, and International Patent Application No. PCT/EP2021/076265, filed Sep. 23, 2021, the entire contents of which are incorporated herein by reference.

TECHNICAL FIELD

The invention relates to a fill level measuring device serving for determining a three dimensional fill level profile.

BACKGROUND

Applied in process automation technology for registering relevant process parameters are corresponding field devices. For the purpose of registering process parameters of interest in corresponding field devices, suitable measuring principles are implemented, in order to register as process parameter, for instance, a fill level, a flow, a pressure, a temperature, a pH value, a redox potential or a conductivity. The most varied of such field device types are manufactured and sold by the firm, Endress+Hauser.

For fill level measurement of fill substances in containers, contactless measuring methods have proven themselves, since they are robust and low-maintenance. Another advantage of contactless measuring methods is their ability to measure the fill level virtually continuously. In the field of continuous fill level measurement, consequently, primarily radar based measuring methods are applied (according to the invention, the terminology, "radar" refers to signals, or electromagnetic waves, having frequencies between 0.03 GHz and 300 GHz). An established measuring method, in such case, is FMCW ("Frequency Modulated Continuous Wave"). The FMCW based fill level measuring method is described, for example, in Offenlegungsschrift DE 10 2013 108 490 A1.

By means of the FMCW method, it is possible to measure a distance, or the fill level, at least at a point. In such case, the point, at which the fill level is measured, depends on the orientation of the transmitting-/receiving antenna, i.e. on the direction of the lobe of its beam (due to the generally reciprocal properties of antennas, the characteristic, or the beam angle of the beam lobe, of an antenna is independent of whether it is transmitting/sending or receiving; the terminology "angle" or "beam angle" in the context of present invention means the angle, at which the beam lobe has its maximum transmitting intensity, or receiving sensitivity).

In the case of liquid fill substances, whose fill level is uniform, a pointwise fill level measurement is sufficient. In such cases, the fill level measuring device is so oriented that the beam lobe of the antenna is directed, for instance, perpendicularly downwards toward the fill substance and the distance from the fill substance is determined. In the case of solid-type fill substances, such as gravel or grain, the fill level can, however, be nonuniform, for example, as a result of so-called bulk-good cones, such that the fill level value ascertained by the fill level measuring device is only limitedly accurate. Especially in such cases, it is, consequently, desirable, to be able to determine the distance, or the fill level, in the form of a three dimensional fill level profile.

In order to do this, the fill level measuring device needs to be designed to be able to assign an associated solid angle to incoming radar signals. Such can be done, for example, by means of the MIMO principle ("Multiple Input Multiple Output"). Such principle is based on corresponding operating of an antenna arrangement, which is composed of column arranged transmitting antennas and row arranged receiving antennas, in order to implement a digital beam formation of the resulting radar signal. As concerns hardware, such can be implemented, for example, by means of correspondingly programmed MMICs' "(Monolithic Microwave Integrated Circuits"). MIMO based radar systems are described in more detail, for example, in "*MIMO Radar Signal Processing*" (Jian Li), 2009.

Above all for explosion protection of the fill level measuring device, often a spatial isolation is required between the active, thus, electrical current supplied, transmitting/receiving unit and the passive antenna arrangement. The transmitting/receiving unit is, consequently, arranged outside of the container, while the antenna arrangement must extend into the container and, thus, be exposed to the process conditions within the container. In order to implement this division, the transmitting/receiving unit is isolated spatially from the antenna arrangement by a corresponding measuring device neck. In such case, the radar signals are led from/to the antenna arrangement through the measuring device neck to the transmitting/receiving unit. For example, for explosion protection, the measuring device neck includes, moreover, in given cases, a process seal, which, after installation, for example, using a flange, seals the container opening provided for the fill level measuring device.

Besides explosion protection requirements, the measuring device neck must fulfill other protection functions: Depending on application, high temperatures, high pressure or dangerous gases can be present in the interior of the container. Therefore, the measuring device neck and the flange must provide a pressure seal, a temperature barrier and a gas seal. These functions and the installation requirements together require between the transmitting/receiving unit and the antenna arrangement a significant distance, over which the measurement signals must be led with as little loss as possible. In pointwise measuring, fill level measuring devices, such distance can be bridged by a single waveguide, wherein, depending on frequency region, coaxial lines, hollow conductor or dielectric waveguide can be applied.

In three dimensionally mapping fill level measuring devices, which work based on digital beam formation, the distance between the transmitting/receiving unit and the antenna arrangement must, however, be not only for a single radar signal, but, instead, as a function of the number of antennas, for correspondingly many radar signals. In the case of technically and economically feasible solutions, this can require more than 200 waveguides. Structurally and from a manufacturing point of view, this is, however, difficult to implement.

SUMMARY

It is, accordingly, an object of the invention to provide a three dimensionally mapping fill level measuring device, which is easy to manufacture and can be used under difficult process conditions.

The invention achieves this object by a radar based, fill level measuring device for determining a fill level profile of a fill substance in a container. For this, the fill level measuring device includes components as follows:

An antenna arrangement, having a defined number of transmitting antennas, by means of which, in each case, a radar signal is transmittable to the fill substance, and a defined number of receiving antennas, by means of which after reflection of the radar signal on the fill substance surface, in each case, a received signal is receivable, a transmitting/receiving unit, which is designed, to produce radar signals, for example, according to the MIMO principle, and based on received signals to create the fill level profile, and a measuring device neck, which is arranged along a central device neck axis between the antenna arrangement and the transmitting/receiving unit and which has a number of transmitting waveguides corresponding to the number of transmitting antennas and extending within the measuring device neck in parallel with the device neck axis and connecting the transmitting antennas, in each case, with the transmitting/receiving unit, and a number of receiving waveguides corresponding to the number of receiving antennas and extending within the measuring device neck in parallel with the device neck axis and connecting the receiving antennas, in each case, with the transmitting/receiving unit.

In such case, the transmitting waveguides and/or the receiving waveguides can, in principle, be designed as hollow conductors, coaxial cables or dielectric waveguides.

The fill level measuring device of the invention is characterized by features including that the transmitting waveguides are aligned along a first contour, which radially symmetrically surrounds the device neck axis, preferably at regular intervals relative to one another, and the receiving waveguides are aligned either likewise along the first contour or along a second contour, which surrounds the device neck axis likewise radially symmetrically. In such case, also the receiving waveguides can be arranged at regular intervals and alternately with the transmitting waveguides when the receiving waveguides are also arranged along the first contour. For the case, in which the receiving waveguide are arranged along the second contour, it is not essential per se, whether the transmitting waveguides are arranged outside or inside the receiving waveguides with reference to the device neck axis, thus, whether the first contour extends outside the second contour, or not. This can be made dependent, for example, on the implementation of the MIMO principle, or on whether more transmitting antennas or more receiving antennas are required for this and the required number of transmitting- and receiving waveguides.

The terminology "radially symmetric contours" means within the scope of the invention a contour, which with reference to the device neck axis can be divided into at least two, equally large angular segments, wherein the contour in each of the equally large angular segments has an equal course. Accordingly, a radially symmetric contour is, within the scope of the invention, for example, a circular, elliptical or rectangular contour. Advantageous in this regard is when the measuring device neck, the first contour as well as also the second contour have relative to the device neck axis an equal radial symmetry, such as, for example, a circular symmetry. Advantageously, the contours can relative to the measuring device neck be so dimensioned that the waveguides directly adjoin the measuring device neck, or the next outwardly lying waveguide basic body. In this way, there is centrally in the measuring device neck further free space for additional passageways, or components, of the fill level measuring device.

In reference to the transmitting/receiving unit, the terminology "unit" means in the context of the invention, in principle, any electronic circuit, which is suitably designed for the contemplated application. It can, thus, depending on requirement, be an analog circuit for producing, or processing, corresponding analog signals. It can also be a digital circuit, such as an FPGA or a storage medium in cooperation with a program. In such case, the program is designed to perform the corresponding method steps, or to apply the required computer operations of the particular unit. In this context, different electronic units of the measuring device can, within the scope of the invention, potentially also use a shared physical memory, or be operated by means of the same physical, digital circuit. In particular, the transmitting/receiving unit can for operating the antenna arrangement via the waveguides be based, for example, on a corresponding number of MMICs ("Monolithic Microwave Integrated Circuits"), since, depending on design these are able to perform the operations required for implementing the MIMO principle, such as the impressing of phase shifts, amplifying the signal amplitude, or the like.

When MMICs are used, the arrangement of the invention for the transmitting- and receiving waveguides acts, then, advantageously for the transmitting/receiving unit, in that the distance between the individual MMICs can be maximized. Since MMICs have generally a comparatively large thermal power loss, the thermal loading of the MMICs on one another and the thermal loading within the transmitting/receiving unit are, as a whole, minimized by maximizing the distances. For this, the MMICs are arranged above the measuring device neck as well as with reference to the device neck axis along the first contour, in each case, between one of the transmitting waveguides and one of the receiving waveguides, provided that the receiving waveguides are aligned alternately with the transmitting waveguides along the first contour. When the receiving waveguides are arranged not such as the transmitting waveguides along the first contour, but, instead, along the second contour, the MMICs are arranged above the measuring device neck as well as relative to the device neck axis between the first contour and the second contour.

The arrangement of the invention for the waveguides in the measuring device neck can be constructively and productively easily implemented by means of at least one shared, especially monolithic, basic body. In such case, the transmitting waveguides and, when the receiving waveguides are aligned alternately with the transmitting waveguides along the first contour, supplementally also the receiving waveguides can be embodied monolithically by a first basic body, in such a manner that, in each case, a first support structure of the first basic body is arranged between the individual waveguides. When the receiving waveguides are not aligned along the first contour, but, instead, along the second contour, the receiving waveguides can be embodied within the measuring device neck, in turn, by an additional, second basic body, in such a manner that, in each case, a second support structure of the second basic body is arranged between the individual receiving waveguides.

For the case, in which the waveguides are designed as dielectric waveguides, the dielectric waveguides and the first basic body, or the first support structures, can be made as a shared, monolithic, molded part. In such case, the receiving waveguides, when aligned along the second contour, can, in turn, be implemented in such a manner as dielectric waveguides that the receiving waveguides and the second basic body are manufactured as a second, monolithic, molded part. The monolithic, molded parts can especially be made by means of hot forming, injection molding, 3D printing or extrusion, from PTFE, PE or PFA.

In the case of design of the waveguides as hollow conductors, these can be so implemented that at least the first basic body, especially in conjunction with a corresponding interior segment of the measuring device neck, forms the interiors of the hollow conductors. When the receiving waveguides are, in such case, not aligned along the first contour, but, instead, along the second contour, these can, in turn, be implemented as hollow conductors in such a manner that at least the second basic body, especially in connection with the outer or inner, first basic body, forms the interiors of the receiving, hollow conductors. Also, in the case of design of the waveguides as hollow conductors, the one or more basic bodies can be designed as monolithic, molded parts, which are produced, in each case, by means of hot forming, injection molding, extrusion or additive manufacturing, thus, 3D printing, from PTFE, PE or PFA.

BRIEF DESCRIPTION OF THE DRAWINGS

The present disclosure will now be explained in greater detail based on the submitted drawings. The figures of the drawings show as follows.

DETAILED DESCRIPTION

Figure 1:
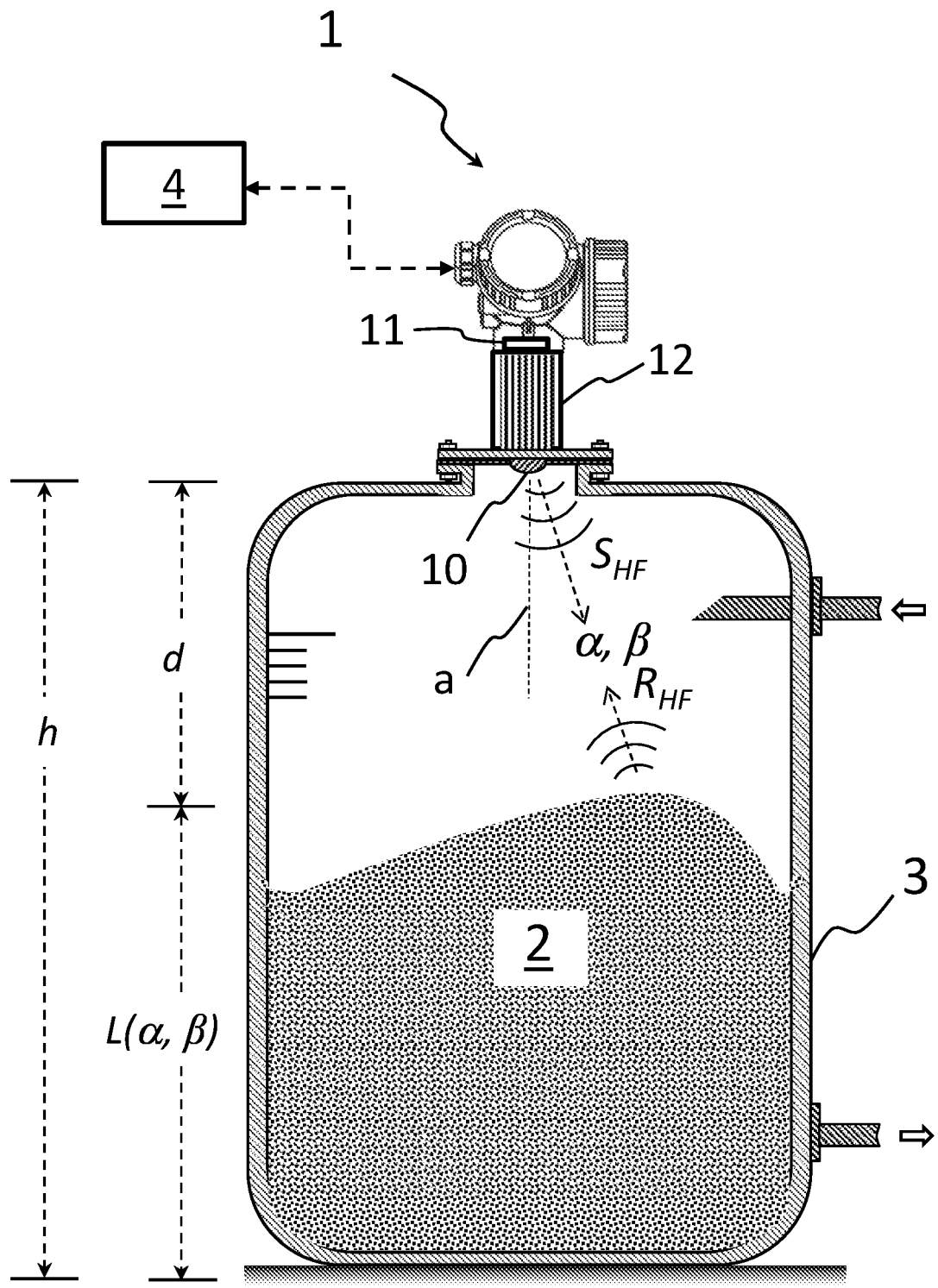
FIG. 1 shows a radar based, fill level measuring device of the present disclosure shown mounted on a container.

For illustrating the principles of radar based fill level measurement, FIG. 1 shows a container 3 having a fill substance 2, whose fill level L is to be registered in the form of a three dimensional fill level profile $L(\alpha,\beta)$. In such case, the container 3 can, depending on type of fill substance 2 and field of application, extend to greater than 100 m high. Also the conditions in the container 3 depend on the type of fill substance 2 and the field of application. Thus, in the case of exothermic reactions, for example, excessive temperature- and pressure loadings can come about. In the case of dust containing or ignitable materials, corresponding explosion protection requirements must be met in the container interior.

In order to be able to ascertain the fill level profile $L(\alpha,\beta)$ independently of the conditions reigning in the container, a fill level measuring device 1 is mounted at a known height h above the fill substance 2 at a corresponding opening on the container 3. In such case, the fill level measuring device 1 is so oriented and secured that it transmits/sends from an antenna arrangement 10 radar signals $S_{HF}$, for instance, along a vertically directed axis a in the direction of the surface of the fill substance 2. After reflection on the fill substance surface, the fill level measuring device 1, in turn, receives the reflected radar signals $R_{HF}$ via the antenna arrangement 10. In such case, the signal travel time between transmitting and receiving the radar signal $S_{HF}$, $R_{HF}$ is proportional to the angularly dependent distance $d(\alpha,\beta)$ between fill level measuring device 1 and fill substance 2, wherein the signal travel time can be determined by the fill level measuring device 1, for example, by means of the FMCW method or the pulse travel time method. Then the fill level measuring device 1 can determine the distance d, for example, based on a corresponding calibration of the measured travel time. In this way, the fill level measuring device 1 can determine the fill level profile $L(\alpha,\beta)$ according to $$d(\alpha,\beta)=h-L(\alpha,\beta)$$

when the installed height h is furnished in the fill level measuring device 1.

As a rule, the fill level measuring device 1 is connected to a superordinated unit 4, such as e.g. a process control system, via an interface, for instance, "PROFIBUS", "HART" or "Wireless HART". In this way, the fill level profile $L(\alpha,\beta)$ can be transmitted, for example, in order, in given cases, to control incoming- or outgoing flows of the container 3. However, also other information concerning general operating state of the fill level measuring device 1 can be communicated.

Since the fill substance 2, such as shown schematically in FIG. 1, for example, in the case of bulk goods, does not have a planar surface, the fill level measuring device 1 is correspondingly designed to use digital beam pivoting to determine the fill level L in the form of a three dimensional fill level profile $L(\alpha,\beta)$. Accordingly, the antenna arrangement 10 includes a plurality of transmitting- and receiving antennas, which are arranged, for example, with reference to a substrate in the form of columns and rows at right angles relative to one another. In such case, the transmitting antennas of the antenna arrangement 10 serve for transmitting a radar signal $S_{HF}$ in the direction of the fill substance 2. The corresponding reflected radar signals $R_{HF}$ are received by means of the receiving antennas.

The antennas of the antenna arrangement 10 are operated by a transmitting/receiving unit 11 of the fill level measuring device 1. For implementing the digital beam pivoting in the transmitting/receiving unit 11, for example, the MIMO principle can be used. By this, the transmitting/receiving unit 11 can assign the received radar signals $R_{HF}$ their solid angles $\alpha,\beta$ with reference to the vertical axis a and, based on this, create the three-dimensional fill level profile $L(\alpha,\beta)$.

As shown in FIG. 1, the antenna arrangement 10 is arranged in the interior of the container 3, while the transmitting/receiving arrangement 11 is arranged outside of the container 3 in a separate housing. In order to protect the transmitting/receiving unit 11 against possible thermal loadings from the container interior, or in order to isolate the container interior explosion protection-conformly from the transmitting/receiving unit 11, the housing is spaced from the antenna arrangement 10 by a measuring device neck 12. In such case, the device neck axis a of the measuring device neck 12 directed perpendicularly to fill substance 2 and defining the distance between the transmitting/receiving unit 11 and the container is designed correspondingly long.

The high frequency connecting of the transmitting- and receiving antennas of the antenna arrangement 10 to the transmitting/receiving unit 11 occurs via a corresponding number of transmitting waveguides 121, 121' and receiving waveguides 122, 122', which correspond, in each case, to the number of transmitting- and receiving antennas and extend within the measuring device neck 12 in parallel with device neck axis a. In such case, the transmitting waveguides 121, 121' and/or the receiving waveguide 122, 122' can, in principle, be designed either as hollow conductors 121', 122' or as dielectric waveguides 121, 122. In order that the array arranged antennas are connected correctly to the corresponding waveguides 121, 121', 122, 122', the fill level measuring device 1 can comprise a manifold (not shown in greater detail) in the form of a lateral redistributor structure, which is arranged between the antenna arrangement 10 and the measuring device neck 12. For explosion protection-conforming closing of the measuring device neck 12, additionally, there can be arranged in its interior a hermetic isolation, which is based, for example, on a glass or a ceramic and is introduced by means of welding in the measuring device neck 12.

In order in the case of the fill level measurement to be able to achieve an effective angular resolution, it is necessary that the antenna arrangement 10 has a minimum number of transmitting- and receiving antennas. In the case of technically and economically sensible solutions, this corresponds to between 16 and 200 transmitting and receiving channels for sufficiently exact implementing of the MIMO principle. With rising number of antennas, it is, however, difficult, so to design, and manufacture, the corresponding number of waveguides 121, 121', 122, 122' that they are easily arrangeable within the measuring device neck 12 and take up as little space as possible.

In order to enable this, the transmitting waveguides 121, 121' are according to the invention aligned relative to one another at regular intervals along a first contour $k_1$, which radially symmetrically surrounds the device neck axis a of the measuring device neck 12. Also the receiving waveguides 122, 122' are arranged either alternately with the transmitting waveguides 121, 121' along the first contour $k_1$, or the receiving waveguides 122 are arranged aligned along a second contour $k_2$, which likewise radially symmetrically surrounds the device neck axis a. In such case, the first contour $k_1$ and, in given cases, the second contour $k_2$ ideally follow the cross sectional shape of the measuring device neck 12. This means, in the case of a round cross section of the measuring device neck 12, that the first contour $k_1$ and, in given cases, the second contour $k_2$ are circular.

Figure 2:
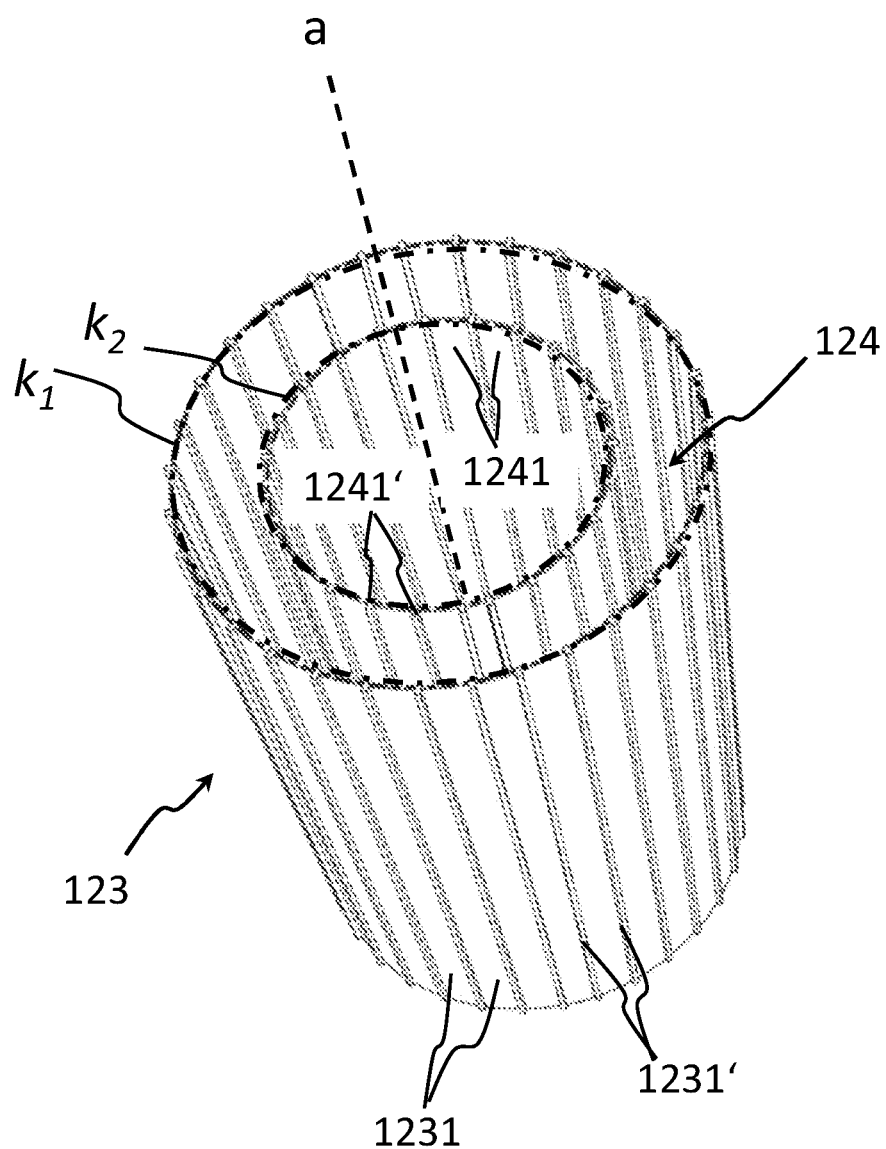
FIG. 2 shows a three-dimensional view of basic bodies, by means of which waveguides can be implemented in the measuring device neck.

For manufacturing, this arrangement of the invention for the waveguides 121, 121', 122, 122' within the measuring device neck 12 offers the advantage that the waveguides 121, 121' 122, 122' can be embodied together in a first basic body 123 and, in given cases, supplementally, a second basic body 124, such as shown in the three-dimensional view of FIG. 2: Shown in FIG. 2 are two basic bodies 123, 124, which are embodied, in each case, circularly along the contours $k_1$, $k_2$ relative to the device neck axis a, such that the basic bodies 123, 124 have along the device neck axis a, in each case, a cylindrical basic form. In such case, the basic bodies 123, 124, as monolithic parts, have at regular intervals along the contours $k_1$, $k_2$, in each case, alternately thickened segments 1231', 1241' and narrowed segments 1231, 1241, which define the number, positions and geometry of the individual waveguides 121, 121' 122, 122'.

For the case, in which the waveguides 121, 121' 122, 122' are dielectric waveguides 121, 122, the dielectric waveguides 121, 122 are formed along the contours $k_1$, $k_2$ by the thickened segments 1231', 1241' of the basic bodies 123, 124. In order to be able to function as dielectric waveguides 121, 122, the basic bodies 123, 124 are correspondingly produced from an electrically insulating material having a dielectric constant of at least two. Utilized for this can be, for example, plastics such as PTFE, PE or PFA. The narrowed segments 1231, 1241 form in the case of dielectric waveguides, in each case, a support structure between the individual dielectric waveguides 121, 122.

When the waveguides 121, 121' 122, 122' are embodied as hollow conductors 121', 122', they behave as regards the segments 1231, 1231', 1241, 1241' exactly oppositely. The thickened segments 1231', 1241' of the basic bodies 123, 124 form in the contours $k_1$, $k_2$ support structures between the hollow conductors 121', 122', wherein the actual hollow conductors in the contours $k_2$ are defined by the surfaces of the basic bodies 123, 124 in the region of the narrowed segments 1231, 1241. The hollow conductors 121', 122' are, thus, embodied virtually as negative-shapes of the narrowed segments 1231', 1241' in the basic body 123, 124. In the case of such a design of the waveguides 121, 121' 122, 122' as hollow conductors 121', 122', it is necessary that the basic bodies 123, 124 at least in the region of the narrowed segments 1231', 1241' have electrically conductive surfaces. For this, the basic bodies 123, 124 can be produced, for example, from a plastic and provided with an electrically conductive coating, for example, by means of sputtering or PECVD ("Plasma Enhanced Chemical Vapor Deposition"). Otherwise, the basic body 123, 124 can be made, for example, completely of metal.

In the case of the embodiment shown in FIG. 2, as well as in the case of the embodiments yet to be described for the measuring device neck 11, the basic bodies 123, 124 are so designed that the waveguides 121, 121', 122, 122' have a rectangular cross section. In contrast, it is, within the scope of the invention, however, likewise an option so to design the illustrated variants of the measuring device neck 11 that the waveguides 121, 121', 122, 122' have, for example, round cross sections.

Advantageous for plastic basic bodies 123, 124 as regards their production is that they can be made as yard goods, for example, by means of extrusion, and cut to the desired length and contour $k_1$, $k_2$. Then, the basic body 123, 124 is formed by coiling the tailored plastic yard good in the measuring device neck 12. In such case, the measuring device neck 12 can, in given cases, serve as holder for at least the outer, first basic body 123, such that (depending on whether the transmitting waveguides 121, 121' or the receiving waveguides 122, 122' are arranged outwardly lying with respect to the device neck axis a when not all waveguides 121, 121', 122, 122' are aligned on a shared contour $k_1$) the corresponding waveguides 121, 121', 122, 122' adjoin the inside of the measuring device neck 12. The second basic body 124, and the waveguides 122, 122' in given cases aligned along the second contour $k_2$, then adjoin the inside of the first basic body 123.

Figure 3:
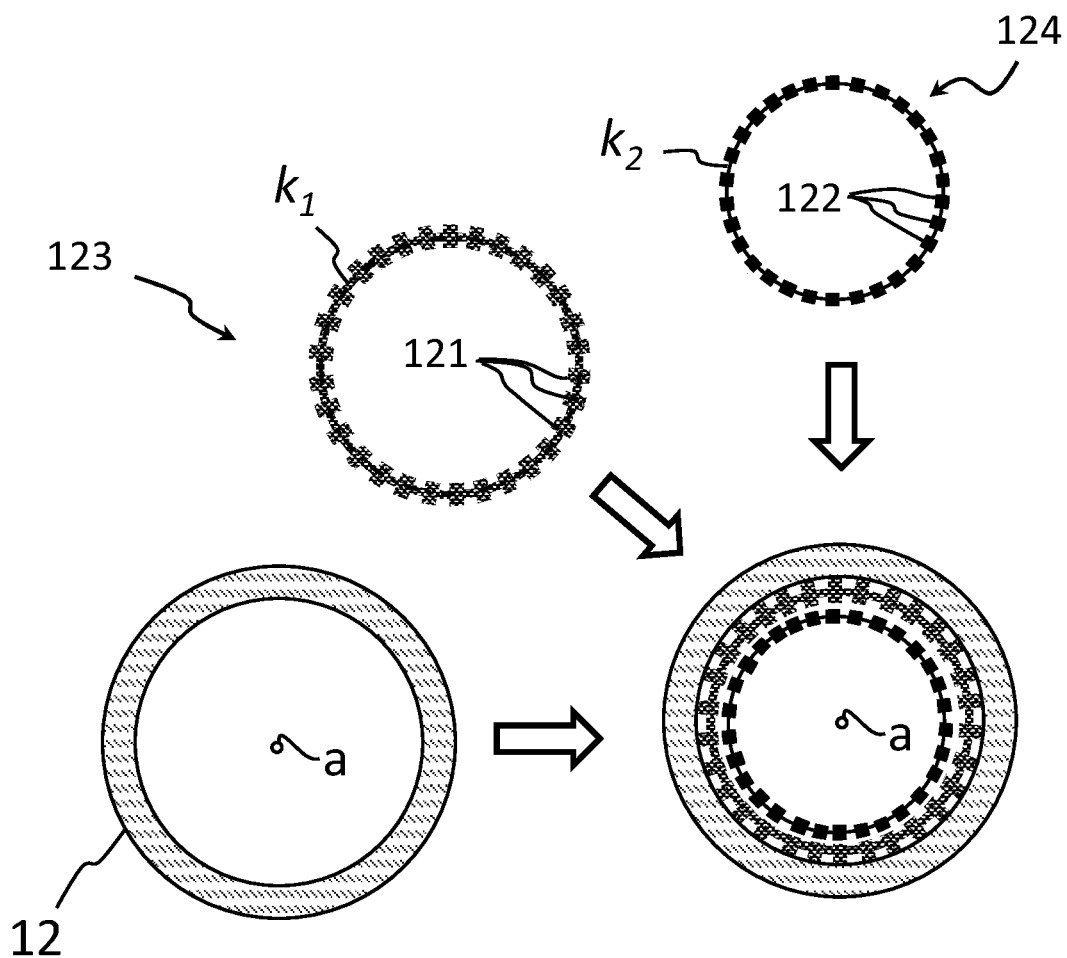
FIG. 3 shows a first variant of the measuring device neck of the fill level measuring device.

FIG. 3 shows, in plan view of the housing-neck 12 in the direction of the neck axis a, this way of populating the housing neck 12 with the waveguides 121, 122. In this illustrated embodiment, the first basic body 123 forms the transmitting waveguides 121 as dielectric waveguides, and the second basic body 124 forms the dielectric receiving waveguides 122. In such case, the first contour $k_1$ extends with respect to the device neck axis a outside of the second contour $k_2$, such that the first basic body 123 with the dielectric transmitting waveguides 121 is arranged with respect to the device neck axis a after assembly outside of the second basic body 124, and outside of the receiving waveguides 122. In such case, the housing-neck 12, the first basic body 123, i.e. the first contour $k_1$, and the second basic body 124, i.e. the second contour $k_2$, have a circular, radial symmetry. Advantageous for the fill level measuring device 1 in such arrangement, in the case of which the waveguides 121, 122 are arranged outwardly and adjoining the inside of the housing neck 12, is that in the center of the measuring device neck 12 along the device neck axis a free space is then available for possible other passageways and installed objects of the fill level measuring device 1.

Figure 4:
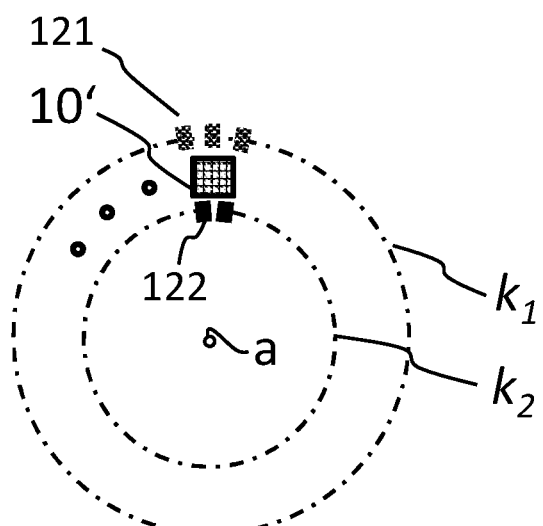
FIG. 4 shows a possible arrangement of the transmitting/receiving unit for the first variant of the measuring device neck.

FIG. 4 shows that the arrangement of the invention for the waveguides 121, 121' 122, 122' is also advantageous for the layout of the transmitting/receiving unit 11. Thus, for operating the antenna arrangement 10 via the waveguides 121, 121', 122, 122', the transmitting/receiving unit 11 includes as high frequency components preferably MMICs 10', since by means of them, depending on design, a plurality of radar signals $S_{HF}$, $R_{HF}$ can be processed separately from one another. For example, by means of the MMICs 10', a defined phase shift can be imposed per antenna, and per waveguide 121, 121', 122, 122', the signal amplitude can be amplified, and/or the received radar signal $R_{HF}$ can be converted into an electrical signal, etc. The MIMO principle can be implemented, for example, within the transmitting/receiving unit 11, in order to perform the beam pivoting of the transmitted radar signals $S_{HF}$. The individual waveguides 121, 121', 122, 122' can be connected for high frequency transmission, for example, via suitable in-coupling-structures at their upper end regions, for example, in the form of a conical pointing of the waveguides 121, 121', 122, 122' toward the MMICs 10'. Also toward the antenna arrangement 10, the waveguides 121, 121', 122, 122' can be provided on their lower end regions with corresponding in-coupling-structures.

Among other things, in order to achieve a sufficient angular resolution for the beam pivoting, the number of antennas exceeds the available number of transmitting and receiving channels per MMIC by a multiple, such that a corresponding plurality of MMICs 10' are associated with the transmitting-receiving unit 10. With the rising number of MMICs 10', however, the danger increases that they thermally load one another excessively, since each individual MMIC 10' generates a considerable thermal power loss. By the arrangement of the MMICs 10', as shown in FIG. 4, above the measuring device neck 12, the mutual thermal loading of the MMICs 10' is minimized, since the possible distance between the individual MMICs 10' is maximum. As shown in FIG. 4, the MMICs are arranged for this between the first contour $k_1$ and the second contour $k_2$ relative to the device neck axis a. Thus, the MMICs 10' are mutually spaced along the contours $k_1$, $k_2$ uniformly and maximally. For reasons of perspicuity, FIG. 4 shows only one MMIC 10' along the contours $k_1$, $k_2$.

Figure 5:
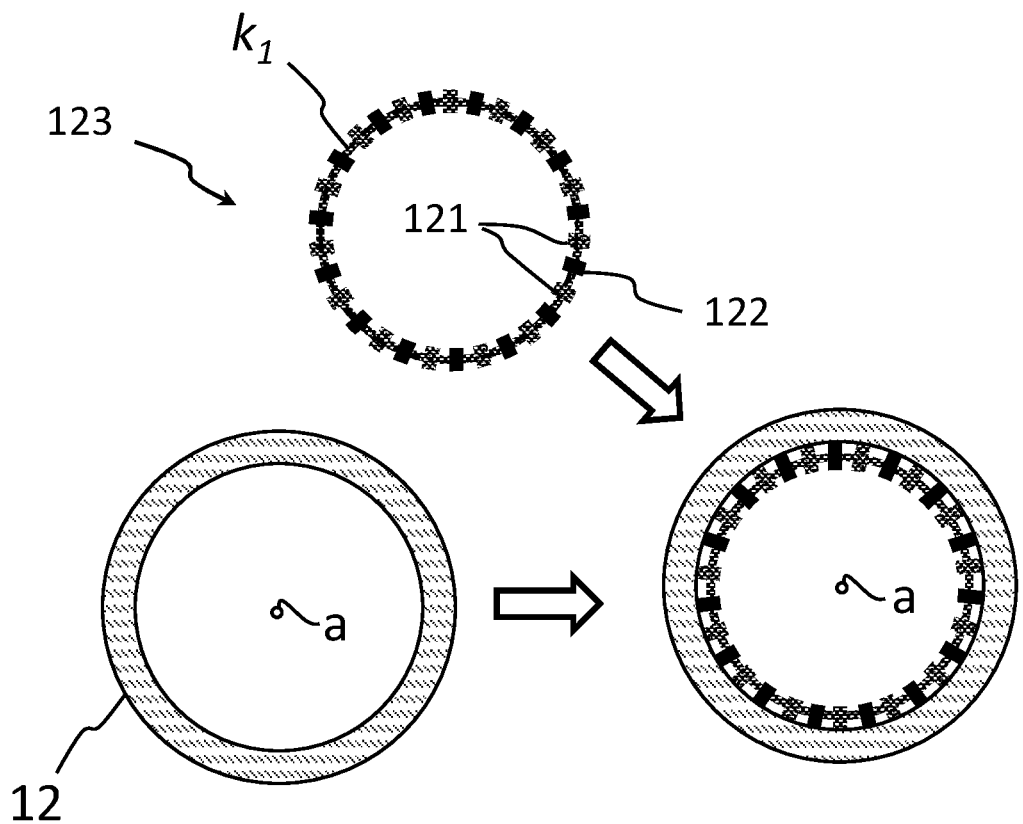
FIG. 5 shows a second variant of the measuring device neck.

A second possible embodiment of the measuring device neck 12 is shown in FIG. 5. The variant shown there is like the measuring device neck 12 described with reference to FIG. 3, except for the arrangement of the dielectric waveguides 121, 122. In contrast with FIG. 3, the measuring device neck 12 of FIG. 5 lacks a second basic body 124. Instead, besides the transmitting waveguides 121, also the dielectric receiving waveguides 122 are components of the first basic body 123. Accordingly in such case, the dielectric transmitting waveguides 121 and the dielectric receiving waveguide 122 are arranged at equal distances from one another, alternately along the first contour $k_1$. Advantageous in such embodiment is that a second basic body 124 can be omitted. However, at otherwise equal dimensions of the individual waveguide cross sections, less waveguides 121, 122 can be accommodated.

Figure 6:
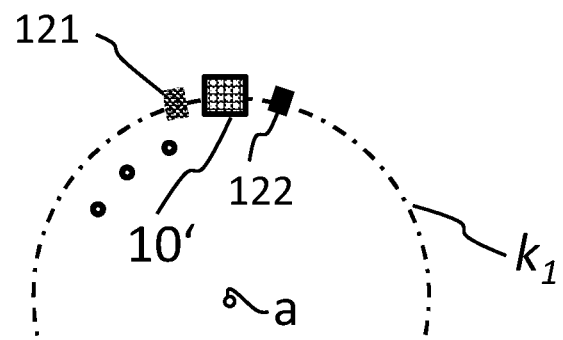
FIG. 6 shows a possible arrangement of the transmitting/receiving unit for the second variant of the measuring device neck.

Analogously to FIG. 4, also the embodiment shown in FIG. 5 favors the thermal management within the transmitting/receiving unit 11. As shown in FIG. 6, the MMICs 10' can, in such case, be arranged above the measuring device neck 12 in such a manner within the transmitting/receiving unit 11 that they are arranged relative to the device neck axis a along the first contour $k_1$, in each case, between one of the transmitting waveguides 121, 121' and one of the receiving waveguides 122, 122'. Thus, the MMICs 10' are, also in such case, spaced maximally relative to one another, such that the thermal influence on one another is minimized. Also in FIG. 6 for reasons of perspicuity, only one MMIC 10' is shown along the contour $k_1$.

Figure 7:
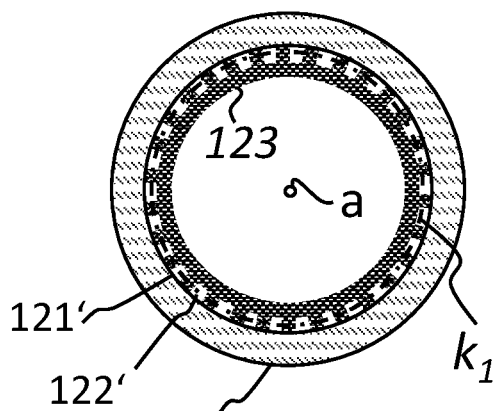
FIG. 7 shows a third variant of the measuring device neck.

In contrast with the examples of embodiments of the measuring device neck illustrated in FIGS. 3 and 5, it is also possible to embody the waveguides 121, 121', 122, 122' by means of the basic body 123, 124 not as dielectric waveguides 121, 122, but, instead, as hollow conductors 121', 122'. I.e., the hollow conductors 121', 122' are embodied in this case in the region of the narrowed segments 1231', 1241' of the basic bodies 123, 124 as their negative forms. Different embodiments for this are shown in FIGS. 7 to 10:

In the case of the embodiment in FIG. 7, only the first basic body 123 is inserted in the measuring device neck 12. In such case, the first basic body 123 and the first contour $k_1$ are embodied in such a manner relative to the measuring device neck 12 that the hollow conductors 121', 122' relative to the device neck axis a directly adjoin the inside of the measuring device neck 12. Since the hollow conductors 121;' 122' are embodied only by the first basic body 123, both the transmitting waveguides 121' as well as also the receiving waveguides 122' are arranged alternately along the first contour $k_1$.

Figure 8:
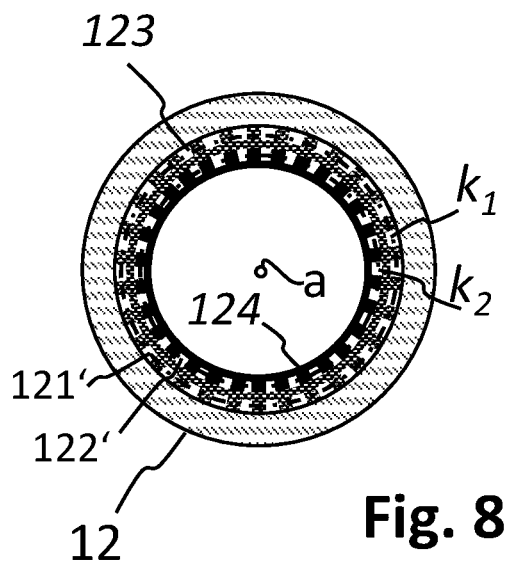
FIG. 8 shows a fourth variant of the measuring device neck.

The embodiment of the measuring device neck 12 of the invention shown in FIG. 8 corresponds essentially to the variant shown in FIG. 7, except that, in such case, the receiving, hollow conductors 122', analogously to the embodiment shown in FIG. 3, are arranged inside of the first basic body 123, and inside of the transmitting hollow conductors 121'. For this, the second basic body 124 is arranged inside of the first basic body 123, in such a manner that the second basic body 124 in conjunction with the first basic body 123 forms the inner walls of the rectangular receiving hollow conductors 122'. As shown in FIG. 8, accordingly three sides of the rectangularly cross sectioned hollow conductor interiors of the receiving, hollow conductors 122' are formed by the second basic body 124, while, the fourth, relative to the device neck axis a, outer side of the hollow conductors is formed by a corresponding segment of the first basic body 123.

Figure 9:
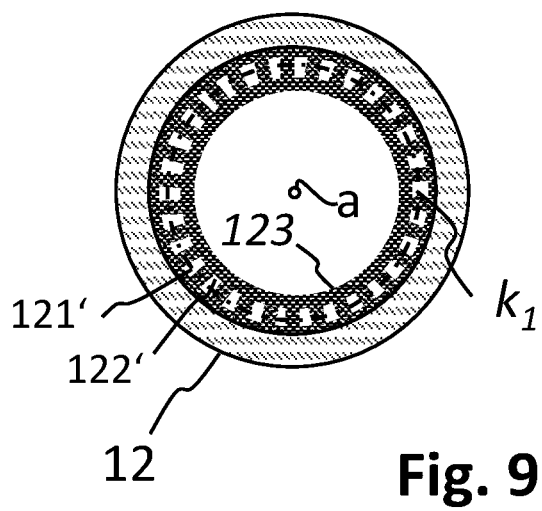
FIG. 9 shows a fifth variant of the measuring device neck.

Also the embodiment shown in FIG. 9 corresponds to the variant of the measuring device neck 12 of the invention shown in FIG. 7, with the difference that the hollow conductors 121', 122' relative to the device neck axis a do not directly adjoin the inside of the measuring device neck 12. Rather, the hollow conductors 121', 122' are embodied as complete negative shapes of the first basic body 123. Especially in the case of this design variant, it is productively possible to provide the hollow conductors 121', 122' with a non-rectangular inner cross section, such as, for example, with a round inner cross section. The second basic body 124 is not provided in the case of this embodiment. Advantageous in the embodiment shown in FIG. 9 is that the hollow conductors 121' 122' cannot form gaps between the basic bodies 123, 124, or with the interior of the measuring device neck 12, so that high frequency characteristics cannot be degraded thereby.

Figure 10:
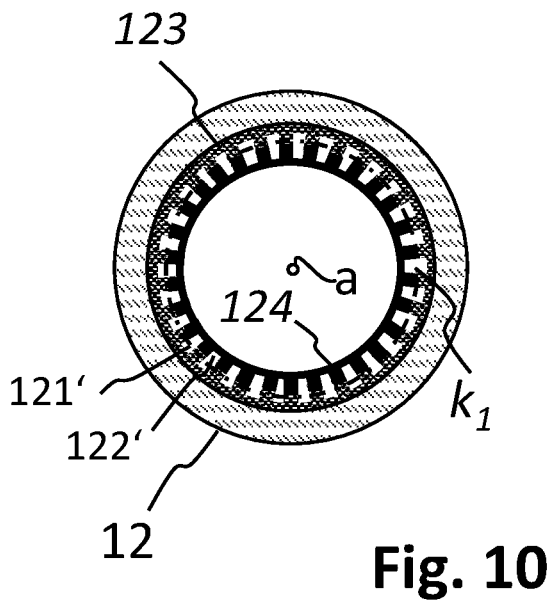
FIG. 10 shows a sixth variant of the measuring device neck.

Among others, for the case, in which the desired material production technology does not allow the hollow conductors 121', 122' of FIG. 9 to be formed as complete, negative shapes of the first basic body 123, FIG. 10 shows another design variant of the measuring device neck 12 of the invention. In this case, both the transmitting hollow conductors 121, as well as also the receiving, hollow conductora 122', are arranged along the first contour $k_1$. In such case, the hollow conductors 121', 122' are, however, formed both by the first basic body 123 and by the second, internal, basic body 124. For this, the basic bodies 123, 124 are so oriented relative to one another that their narrowed segments 1231, 1241 coincide with one another and have, in each case, a corresponding cross section, in order correspondingly to establish the hollow conductor cross sections.

The invention claimed is:

1. A radar based, fill level measuring device for determining a fill level profile ($L(\alpha,\beta)$) of a fill substance, comprising:
    an antenna arrangement, including:
        a defined number of transmitting antennas, wherein, in each case, a radar signal is transmittable to the fill substance; and
        a defined number of receiving antennas, wherein after reflection of the radar signal on the fill substance surface, in each case, a received signal is receivable;
    a transmitting/receiving unit, which is designed to:
        produce radar signals, and
        based on received signals, create the fill level profile ($L(\alpha,\beta)$); and
    a measuring device neck, which is arranged along a central device neck axis between the antenna arrangement and the transmitting/receiving unit and which includes:
        a number of transmitting waveguides corresponding to the number of transmitting antennas and extending within the measuring device neck in parallel with the device neck axis and connecting the transmitting antennas, in each case, with the transmitting/receiving unit; and
        a number of receiving waveguides corresponding to the number of receiving antennas and extending within the measuring device neck in parallel with the device neck axis and connecting the receiving antennas, in each case, with the transmitting/receiving unit;
    wherein:
        the transmitting waveguides are aligned along a first contour, which radially symmetrically surrounds the device neck axis; and
        the receiving waveguides are aligned either along the first contour or along a second contour, which surrounds the device neck axis likewise radially symmetrically.

2. The fill level measuring device as claimed in claim 1, wherein for the case in which the receiving waveguides are arranged along the second contour, the transmitting waveguides are arranged relative to the device neck axis outside of the receiving waveguides.

3. The fill level measuring device as claimed in claim 1, wherein the measuring device neck, the first contour and the second contour have relative to the device neck axis an equal radial symmetry.

4. The fill level measuring device as claimed in claim 1, wherein the transmitting/receiving unit includes, for operating the antenna arrangement via the waveguides, a corresponding number of MMICs;
    wherein the MMICs are arranged above the measuring device neck as well as with reference to the device neck axis along the first contour, in each case, between one of the transmitting waveguides and one of the receiving waveguides when the receiving waveguides are aligned alternately with the transmitting waveguides along the first contour; or
    wherein the MMICs are arranged above the measuring device neck as well as relative to the device neck axis between the first contour and the second contour when the receiving waveguides are arranged along the second contour.

5. The fill level measuring device as claimed in claim 1, wherein the transmitting waveguides and/or the receiving waveguides are designed as hollow conductors or as dielectric waveguides.

6. The fill level measuring device as claimed in claim 1, wherein the transmitting waveguides and, when the receiving waveguides are aligned alternately with the transmitting waveguides along the first contour, the receiving waveguides are embodied by a first basic body, in such a manner that, in each case, a first support structure of the first basic body is arranged between the individual waveguides.

7. The fill level measuring device as claimed in claim 6, wherein the waveguides are implemented in such a manner as dielectric waveguides that the dielectric waveguides and the first basic body are manufactured as a monolithic, molded part, wherein the monolithic, molded part is produced by hot forming, injection molding, extrusion or additive manufacturing, from PTFE, PE or PFA.

8. The fill level measuring device as claimed in claim 6, wherein the waveguides are implemented as hollow conductors in such a manner that at least the first basic body forms the interiors of the hollow conductors.

9. The fill level measuring device as claimed in claim 6, wherein the first basic body is designed geometrically in such a manner that the waveguides aligned along the first contour adjoin the measuring device neck.

10. The fill level measuring device as claimed in claim 1, wherein the receiving waveguides, when the receiving waveguides are aligned along the second contour, are embodied within the measuring device neck by at least a second basic body, in such a manner that a second support structure of the second basic body is arranged between the individual receiving waveguides.

11. The fill level measuring device as claimed in claim 10, wherein the receiving waveguides are implemented as dielectric waveguides in such a manner that the receiving waveguides and the second basic body are manufactured as a monolithic, molded part, wherein the monolithic, molded part is produced especially by means of hot forming, injection molding, extrusion or additive manufacturing, from PTFE, PE or PFA.

12. The fill level measuring device as claimed in claim 10, wherein the receiving waveguides are implemented as hollow conductors in such a manner that at least the second basic body forms the interiors of the receiving hollow conductors.

* * * * *